(12) United States Patent
Kimura et al.

(10) Patent No.: US 8,277,633 B2
(45) Date of Patent: Oct. 2, 2012

(54) PROCESS FOR PRODUCING SCORODITE AND RECYCLING THE POST-SCORODITE-SYNTHESIS SOLUTION

(75) Inventors: Yukio Kimura, Hitachi (JP); Shigeo Katsura, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 1155 days.

(21) Appl. No.: 12/155,469

(22) Filed: Jun. 4, 2008

(65) Prior Publication Data

US 2009/0078584 A1    Mar. 26, 2009

(30) Foreign Application Priority Data

Sep. 25, 2007    (JP) .................................. 2007-247264

(51) Int. Cl.
*C01G 28/00* (2006.01)

(52) U.S. Cl. ....................... 205/584; 423/594.1; 423/601

(58) Field of Classification Search .................. 205/584; 423/594.1, 601
See application file for complete search history.

(56) References Cited

U.S. PATENT DOCUMENTS

| | | | | |
|---|---|---|---|---|
| 3,964,901 | A * | 6/1976 | Swinkels et al. | 205/583 |
| 4,229,270 | A * | 10/1980 | Subramanian et al. | 205/569 |
| 6,656,722 | B1 * | 12/2003 | Ruitenberg et al. | 435/262.5 |
| 7,935,328 | B2 * | 5/2011 | Kimura et al. | 423/594.1 |

FOREIGN PATENT DOCUMENTS

| | | |
|---|---|---|
| JP | 11-277075 A | 10/1999 |
| JP | 2005-161123 A | 6/2005 |
| JP | 3756687 B2 | 1/2006 |
| WO | WO-2006/117424 A1 | 11/2006 |

OTHER PUBLICATIONS

Canadian Office Action for Application No. 2,634,878 dated Mar. 30, 2010.

* cited by examiner

*Primary Examiner* — Arun S Phasge
(74) *Attorney, Agent, or Firm* — Birch, Stewart, Kolasch & Birch, LLP

(57) ABSTRACT

The present invention is to provide a process for producing a scorodite that can shorten the time required for synthesizing the scorodite, and further can improve the yield of arsenic and iron into the scorodite. Accordingly, a process for producing a crystalline scorodite from an acidic aqueous solution containing pentavalent As and trivalent Fe, wherein the synthesis of the crystalline scorodite is performed after the molar ratio of trivalent Fe to pentavalent As contained in the acidic aqueous solution is adjusted to be equal to or more than 0.9 and equal to or less than 1.1 is provided.

2 Claims, 1 Drawing Sheet

Effect of Fe/As on reaction rate
(pH 0.50 seed 50g/L)

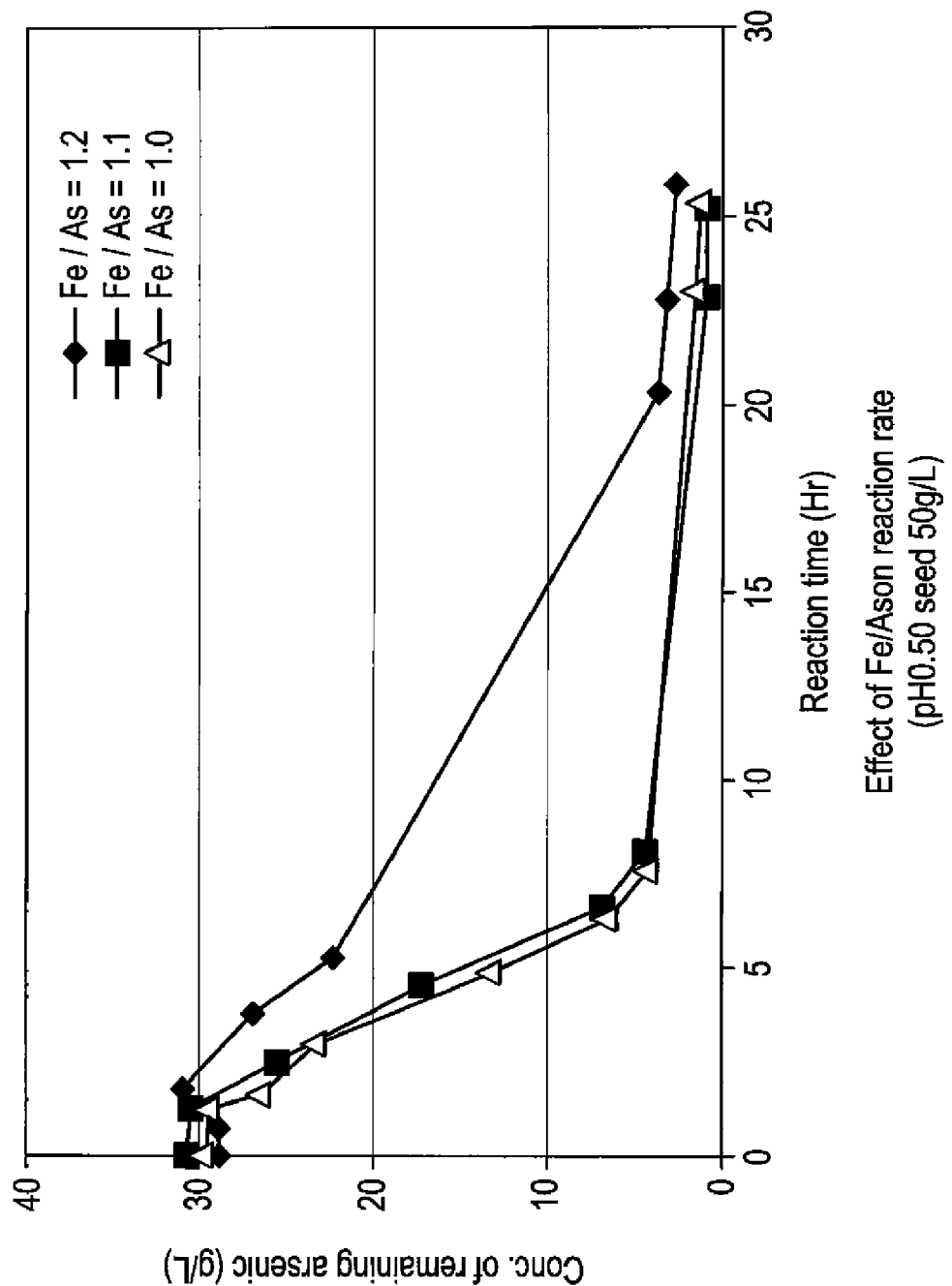

PROCESS FOR PRODUCING SCORODITE AND RECYCLING THE POST-SCORODITE-SYNTHESIS SOLUTION

BACKGROUND OF THE INVENTION

This invention relates to a process for producing scorodite. Especially, it relates to a process for producing scorodite from electrolytically precipitated copper produced during a step for smelting copper. Further, the present invention also relates to a process for recycling the post-scorodite-synthesis solution.

Copper ore contains a variety of impurities such as arsenic (As). Arsenic (As) is separated by volatilization at high temperatures during a dry process for copper refining, but partly remains in crude copper before an electrolytic refining step.

As contained in the crude copper (copper anode) is partly eluted in an electrolytic solution, while the uneluted As is contained in the anode slime that is precipitated on the bottom of the electrolytic bath. Since the copper volume deposited on the cathode is generally larger than that eluted from the anode, the copper content in the electrolytic solution gradually increases. Part of the electrolytic solution is thus transferred to another electrolytic bath to control the quality of the electrolytic solution. The transferred electrolytic solution is subjected to decoppering electrolysis. Impurities such as Cu and As are deposited on the cathode and precipitated on the bottom of the electrolytic bath, which can be recovered. The precipitate on the bottom of the electrolytic bath and the deposition on the cathode are collectively referred to as electrolytically precipitated copper in the art.

Typically, electrolytically precipitated copper is repeatedly fed back to the smelting step. For this purpose, the impurities such as As are preferably separated from the electrolytically precipitated copper. In addition, As may be used as valuables. Thus, there is a need for a technique for individually separating and recovering and fixing As of high quality level from electrolytically precipitated copper. It is known that producing a crystalline of scorodite ($FeAsO_4.2H_2O$) which is a compound of iron and arsenic is useful for fixing arsenic. A crystalline scorodite is chemically stable, and suitable for long-term storage. On the other side, amorphous scorodite lacks the stability and therefore it is not suitable for long-term storage.

Heretofore, it is a process, in which trivalent iron is added to a solution containing pentavalent arsenic and a heat-treatment is performed at the temperature equal to or over 80° C. under acidic condition so that a crystalline scorodite is produced, that has been generally employed as a process for producing a crystalline scorodite from a solution containing arsenic. This technique is described in detail, for example, in Japanese Patent Publication No. 3756687 "Process for eliminating arsenic from a solution containing arsenic and fixing it", Japanese Patent Application Public Disclosure No. 2005-161123 "Process for eliminating arsenic from a smoke ash", and Japanese Patent Application Public Disclosure No. 11-277075 "Process for eliminating arsenic present in a solution of iron sulfate and fixing it".

In these documents, disclosures about Fe/As during synthesis of scorodite, iron concentration of a post-scorodite-synthesis solution, and recovery of copper from the post-scorodite-synthesis solution are given as follows.

It is defined, in Japanese Patent Publication No. 3756687, that Fe/As=1.5-2.0, which is required for improving the crystallinity of arsenic compounds produced, and repressing the eluation of arsenic. It is described that when scorodite is synthesized using the molar ratio outside the above-described range, the crystallinity remarkably decreases and arsenic is liable to elute. In working example in said patent publication, "3 L of a solution containing iron in which Fe is contained at 40 g/L was added to 6 L of the arsenic containing solution so that Fe/As (in molar ratio) may become 1.8, and then the solution was encapsulated into an autoclave, and the temperature was increased to 165° C." is described. Further, with regard to recovery of copper, "zinc powder is added to the post-dearsenic solution obtained and decoppering treatment is applied to the solution, and after recovery of copper, said solution is added to the leached solution together with a post-deiron solution in the above-described process for treatment of the residue of zinc leaching, and then the same treatments are repeated" is disclosed. There is no description about the concentration of iron in the post-scorodite-synthesis solution.

While it is defined, in Japanese Patent Application Public Disclosure No. 2005-161123, that Fe/As=1.0-1.5, the reason why the ratio is so defined is not disclosed. In working example thereof, while "an aqueous solution of ferric sulfate (concentration of iron ion ($Fe^{3+}$) is 80 g/L) at pH 1.0 was added to a leached solution at pH 1.0 obtained by leaching out arsenic from the smoke ash using a solution of sulfuric acid and performing a filtration, so that molar ratio of iron to arsenic may become 1-1.5, and then the mixture was heated to 95° C. under the condition that the concentration of arsenic is equal to or more than 10 g/L to crystallize an amorphous iron arsenate" and "an aqueous solution of ferric sulfate was added so that the molar ratio of iron to arsenic may become 1.3-1.5, and then the mixture was heated to 95° C. under the condition that the concentration of arsenic is 15 g/L to crystallize an amorphous iron arsenate" are described, Fe/As ratio and the concentration of iron in the post-scorodite-synthesis solution are not disclosed clearly. Further, with regard to recovery of copper, "a post-dearsenic solution obtained by filtration of the crystalline of iron arsenate ($FeAsO_4.2H_2O$) is separated into a copper solution and a crude zinc solution, by a solvent extraction, and then the copper solution is electrolytically processed for recovery of copper. The crude zinc solution is subjected to a primary neutralizing treatment, and then, separated, by solid-liquid-separation, into a liquid residue and an iron and arsenic precipitate containing amorphous arsenic, said residue being subjected to a given treatment. Subsequently, said iron and arsenic precipitate containing amorphous arsenic is added again to the leached solution, and the crystallization treatment of step S14 is performed" is disclosed.

In Japanese Patent Application Public Disclosure No. 11-277075, "For obtaining a sufficient precipitation ratio of arsenic, mixing is preferably performed so that 1<Fe/As<3 or Fe/As>10 may be realized, since the speed of forming the precipitate of the compounds of iron and arsenic is slow in the range 3<Fe</As<10" is described. In the working examples, Fe/As was 4 (Example 1), 1.3 (Example 2), and 4.5 (Example 3). While the concentration of iron in the post-scorodite-synthesis solution is not disclosed, it is described that copper is recovered or reused without recovery as a source of copper in a dearsenic process.

SUMMARY OF THE INVENTION

When scorodite is produced using such a method as described in said documents, a crystalline scorodite with a high concentration rate of arsenic may be obtained. However, from the viewpoint of the time required for synthesizing scorodite and degree of conversion of arsenic and iron into scorodite, there is room for improvement. Further, when the degree of conversion of arsenic and iron into scorodite is improved, and thus contents of unreacted iron and/or arsenic remaining in the post-scorodite-synthesis solution are decreased, their treatment cost will be decreased. Further, it is deemed that when the impurities remaining in the post-scorodite-synthesis solution are decreased, the way for recycling the post-scorodite-synthesis solution easily for other use may be opened.

Accordingly, the problem to be solved by the present invention is to provide a process for producing scorodite that can shorten the time required for synthesizing scorodite, and further improve the yield of arsenic and iron into scorodite. Further, another problem to be solved by the present invention is to provide a process for recycling the post-scorodite-synthesis solution.

In the scorodite synthesis, it is theoretically possible to synthesize the scorodite without excess and deficiency, when Fe/As ratio is 1. However, the scorodite synthesis has been actually performed under the condition that iron exists substantially in excess of arsenic. It is deemed that said condition aims to increase the degree of conversion of arsenic into the scorodite. Namely, when the scorodite is produced from trivalent iron ion and arsenate, the reaction rate positively correlates to each concentration of remaining ions. In the case where Fe/As approximates to 1, both ions decrease in the latter half of the reaction, and therefore, it is deemed that the reaction rate will extremely decrease and thus the yield of Fe and As will also decrease.

However, it has been proved, by the studies of the inventors of the present invention, that the reaction rate of the scorodite synthesis under the condition of excess of iron is rather slow and efficiency of the reaction also decreases, and said rate and efficiency of the reaction remarkably increase when trivalent Fe/pentavalent As approximates to 1. Without wishing to be bound by theory, it is deemed that this is due to inhibition of the scorodite synthesis by counterion (e.g., sulfate group) when trivalent iron ion is supplied.

Further, it was proved that when said process for producing a scorodite is performed using a leached solution of electrolytically precipitated copper with sulfuric acid as a source of pentavalent As, post-scorodite-synthesis solution can be directly used as a electrolyte solution used for electrolytically refining copper. So far as the inventors of the present invention know, the conception that Fe remaining in the post-scorodite-synthesis solution is decreased by realizing Fe/As≈1, so that it may be returned to the electrolyte solution is a novel one. Fe decreases the current efficiency of electrolysis and becomes impurities in crude nickel sulfate which is a by-product in the copper smelting process, and therefore, it is necessary to make every effort to prevent the mixing of Fe into the electrolyte solution. Usually, Fe concentration in the electrolyte solution is controlled so that it may be equal to or less than 1 g/L. The process for producing the scorodite according to the present invention is used, it is possible that Fe concentration in the post-scorodite-synthesis solution satisfies said standard.

While metals such as bismuth and antimony are also contained in the electrolytically precipitated copper yielded from a copper smelting process, they are removed in a leaching process with sulfuric acid and a process for synthesizing a scorodite, and therefore, only a negligible amount is contained in the post-scorodite-synthesis solution for using it as an electrolyte solution, as shown in the below-described working examples. Accordingly, it is only iron that is an impurity which becomes an issue when the post-scorodite-synthesis solution is recycled as an electrolyte solution.

In one aspect, the present invention which has been completed on the basis of the above-described knowledge is a process for producing a crystalline scorodite from an acidic aqueous solution containing pentavalent As and trivalent Fe, wherein the synthesis of the crystalline scorodite is performed after the molar ratio of trivalent Fe to pentavalent As contained in the acidic aqueous solution is adjusted to be equal to or more than 0.9 and equal to or less than 1.1.

In one embodiment of the process for producing a scorodite according to the present invention, the molar ratio of trivalent Fe to pentavalent As contained in the acidic aqueous solution is adjusted to be equal to or more than 0.9 and equal to or less than 1.0.

In one embodiment of the process for producing a scorodite according to the present invention, the molar ratio of trivalent Fe to pentavalent As contained in the acidic aqueous solution is adjusted to be equal to or more than 1.0 and equal to or less than 1.1.

In other embodiment of the process for producing a scorodite according to the present invention, trivalent Fe is provided as ferric sulfate.

In yet another embodiment of the process for producing a scorodite according to the present invention, pentavalent As is provided as arsenic acid.

In yet another embodiment of the process for producing a scorodite according to the present invention, said acidic aqueous solution is prepared by adding the trivalent Fe to the sulfuric acid-leached solution of the electrolytically precipitated copper yielded in copper smelting process.

In another aspect, the present invention is a process for recycling a post-scorodite-synthesis solution, comprising the steps of:

(1) conducting a sulfuric acid leaching by feeding an oxygen-containing gas into an electrolytically precipitated copper in an acidic aqueous solution of sulfuric acid, while stirring the solution at a temperature and for a time sufficient for oxidizing As component contained in the electrolytically precipitated copper to pentavalent, followed by solid-liquid-separation of the solution into a post-leaching residue and a sulfuric acid-leached solution containing the pentavalent As component, (2) adding ferric sulfate into said sulfuric acid-leached solution so that the molar ratio of trivalent Fe to pentavalent As may be equal to or more than 0.9 and equal to or less than 1.1 to prepare a reaction solution, followed by synthesis of a crystalline scorodite, (3) after the synthesis of the scorodite, conducting solid-liquid-separation of the reaction solution into a post-scorodite-synthesis solution and a scorodite crystal, and (4) using the post-scorodite-synthesis solution directly as an electrolyte solution used in electrolytic refining of copper.

In one embodiment of the process for recycling the post-scorodite-synthesis solution according to the present invention, the process further comprises the steps of:

(1)' adding water to the post-leaching residue in step (1) for dissolving copper sulfate, followed by solid-liquid separation of a copper sulfate solution from the post-leaching residue, and (3)' adding said copper sulfate solution to the post-scorodite-synthesis solution obtained in Step (3) between Step (3) and Step (4).

Effect of the Invention

The present invention can shorten the time required for synthesizing scorodite, and further improve the yield of arsenic and iron into scorodite. Further, Fe content in the post-scorodite-synthesis solution according to the present invention is little. Therefore, it is possible to recycle the post-scorodite-synthesis solution directly as a electrolyte solution for copper.

BRIEF DESCRIPTION OF THE DRAWING

FIG. 1 shows the relationship between the reaction time and the concentration of the remaining arsenic in the reaction solution.

PREFERRED EMBODIMENT OF THE INVENTION

The present invention is characterized in that when the crystalline scorodite is produced from the acidic aqueous solution containing pentavalent As and trivalent Fe, the molar ratio of trivalent Fe to pentavalent As contained in the acidic solution (hereafter, it is also referred to as "Fe/As ratio") is adjusted to be equal to or more than 0.9 and equal to or less than 1.1. If the synthesis of scorodite is performed after Fe/As ratio is adjusted so that it may be in said range, the time required for synthesizing the scorodite maybe shorten. Further, As and Fe remaining in the post-scorodite-synthesis solution is little because the degree of conversion of arsenic and iron into scorodite is large.

However, from the viewpoint of obtaining a stable scorodite having low arsenic elution, it is preferable to adjust the Fe/As ratio so that it may be equal to or more than 1.0 and equal to or less than 1.1. It is preferable, from the viewpoint of valuing the reaction rate and efficiency of the reaction, to adjust the Fe/As ratio so that it may be equal to or more than 0.9 and less than 1.0. When the efficiency of the reaction is improved, As and Fe contents remaining the post-scorodite-synthesis solution will be decreased.

The process for recycling the post-scorodite-synthesis solution according to the present invention makes it possible, by improving the efficiency of the reaction by said principle and reducing As and Fe contained in the post-scorodite-synthesis solution, to recycle directly to the electrolyte solution used in electrolytic refining of copper. When the amount of the remaining As and Fe is large, it is necessary to separate the As and Fe from the post-scorodite-synthesis solution by coprecipitating them by neutralization, and then return the filtrate to the electrolysis tank. Such a separation process is unnecessary in the present invention. Further, for neutralization, sodium cannot be used because it is accumulated in the electrolysis tank (due to the large solubility of sodium sulfate). Calcium can be used because its solubility in a sulfuric acid solution is little, but a large amount of plaster (calcium sulfate) is precipitated together with iron in neutralization. Further, it is not economically efficient in that it is necessary to add again the sulfuric acid removed as plaster when the post-neutralization solution is returned to the electrolysis solution.

In the present invention, "directly using" the post-scorodite-synthesis solution as an electrolyte solution used in an electrolysis refinery step of copper is to return the post-scorodite-synthesis solution to the electrolysis tank used in an electrolysis refinery step of copper without any separation step, it being allowed to return the solution after dilution with a copper sulfate solution. However, with the process for recycling the post-scorodite-synthesis solution according to the present invention, the remaining Fe in the post-scorodite-synthesis solution reduces, and therefore, even in the case where dilution is necessary, a small amount of dilution makes it possible to use as a electrolysis solution used in the electrolysis refinery step of copper.

In the case where dilution is performed with a copper sulfate solution, if the copper sulfate obtained from the sulfuric acid leaching of electrolytically precipitated copper is used, it is not necessary to supply externally a copper sulfate solution. When a pulp concentration (i.e. the concentration of an electrolytically precipitated copper included in the leached solution at the onset of the leaching) at the sulfuric acid-leaching is increased, for example, the concentration of copper sulfate is increased to 150 g/L (corresponding to the solubility of copper sulfate at 80° C., the solubility of copper sulfate at room temperature being 50-80 g/L), and then the leaching at 80° C. and subsequent cooling to the room temperature are performed, in addition to the post-leaching residue (bismuth, antimony, sulfate of lead, and small amount of copper and arsenic which have not been dissolved, etc.), copper sulfate which exceeds its solubility at room temperature is deposited.

However, when the pulp concentration is too high, the viscosity of the solution becomes abnormally high which makes the stirring impossible, and further, the concentration of copper and arsenic in the leaching solution becomes too high which occasionally leads to the deposition of them from the leaching solution. Therefore, the concentration of copper at the sulfuric acid-leaching is to be about 300 g/L at most.

The sulfuric acid-leached solution and (post-leaching residue+copper sulfate) are separated by a filtration. Further, for separating the post-leaching residue and copper sulfate, when the copper sulfate is dissolved in water or sulfuric acid at 40-60° C., and then filtered again, the post-leaching residue and the copper sulfate solution (also referred to as blue vitriol) can be obtained separately.

Since As and Fe contained in the copper sulfate solution is little, when it is mixed into the post-scorodite-synthesis solution, Fe concentration in the post-scorodite-synthesis solution can be further reduced, and returning the post-scorodite-synthesis solution to the copper electrolysis tank may be further facilitated.

Further, the process for separating the sulfuric acid-leached solution and copper sulfate is advantageous in that the concentration of arsenic in the pre-scorodite-synthesis solution increases, and the amount processed in the reaction tank can be increased. When copper concentration exceeds 50-80 g/L, the copper sulfate is deposited at room temperature, which defines the upper limit of copper concentration at the scorodite synthesis. Since copper is previously removed from the sulfuric acid-leached solution as copper sulfate, arsenic concentration relatively increases at a copper concentration of 50-80 g/L.

From the viewpoint of removing the impurities such as As, it is preferable to wash the mixture of the post-leaching residue and copper sulfate with water in advance. The water used for said washing (referred to as "blue vitriol-washing liquid" here) can be combined with the sulfuric acid leached solution and used as a raw material for synthesizing scorodite.

Since a step for separating the post-leaching residue and copper sulfate is required when the copper sulfate is deposited at the sulfuric acid-leaching, 2-3 times dilution with water (copper concentration is 50-80 g/L) may be performed before cooling if deposition of copper sulfate at the sulfuric acid-leaching is not desirable.

Pentavalent As can be provided in the form of, e.g., arsenic acid ($H_3AsO_4$) and the like, and trivalent Fe can be provided in the form of, e.g., iron oxide, iron sulfate, iron chloride, iron hydroxide and the like. An acidic aqueous solution can be provided, for example, as an aqueous solution of hydrochloric acid, sulfuric acid, nitric acid, perchloric acid and the like. From the viewpoint of returning the post-scorodite-synthesis solution to the copper electrolysis tank, an aqueous solution of sulfuric acid is preferable.

In a typical example, pentavalent As is present in the form of arsenic acid ($H_3AsO_4$) in the sulfuric acid-leached solution after the sulfuric acid-leaching of the electrolytically precipitated copper yielded in the smelting of copper. When the sulfuric acid-leached solution of electrolytically precipitated copper is used as an acidic aqueous solution, the process for recycling the post-scorodite-synthesis solution according to the present invention may be considered to be a process for recycling the sulfuric acid-leached solution of the electrolytically precipitated copper.

The sulfuric acid-leaching of the electrolytically precipitated copper can be performed, for example, as follows.

Firstly, an electrolytically precipitated copper is optionally subjected to washing treatment with water. The washing with water can be performed as follows: an electrolytically precipitated copper is repulped with water, and stirred for 0.5 to 6 hours to elute electrolyte (containing copper sulfate, Ni, Fe) adhered during production of the electrolytically precipitated copper, and trace amounts of Ni and Fe, etc. contained in the electrolytically precipitated copper, followed by filtering the slurry for solid-liquid separation. This step can separate most of the Fe and Ni from the electrolytically precipitated copper.

However, this operation is primarily intended to calculate the amount of zero-valent copper, which is water-insoluble and excludes copper sulfate, from the total copper content in the electrolytically precipitated copper, and to determine more exactly the amount of sulfuric acid required for leaching the electrolytically precipitated copper in the subsequent step. This step is not needed when trace elements such as Ni and Fe are of no great significance, when the copper sulfate content is known, or when only a small amount of electrolyte is incorporated into the electrolytically precipitated copper.

After the washing treatment with water is optionally carried out, the leaching with sulfuric acid comprising feeding an oxygen-containing gas into an electrolytically precipitated copper in a sulfuric acid solution and stirring the solution at a temperature and for a time sufficient to oxidize As component contained in the electrolytically precipitated copper to pentavalent As, and then solid-liquid-separating the solution into a post-leaching residue containing Sb component and Bi component, and a sulfuric acid-leached solution containing the pentavalent As component.

The leaching reaction generally proceeds according to the following scheme in which Cu is oxidized to $Cu^{2+}$; and As is oxidized to $As^{+5}$.

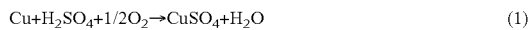

$$Cu + H_2SO_4 + 1/2O_2 \rightarrow CuSO_4 + H_2O \quad (1)$$

$$2As + 5/2O_2 + 3H_2O \rightarrow 2H_3AsO_4 \quad (2)$$

Preferably, the amount of sulfuric acid used is 1.0 to 1.2 equivalents based on the amount of Cu. Below 1.0 equivalent, the leached solution becomes weakly acidic. This leads to precipitates such as $Cu_3AsO_4$ to form and the leaching rates of Cu and As to decrease. Above 1.2 equivalents, the leaching rates of Cu and As are not affected, but the amount of sulfuric acid used increases. Cu and As may be present at any concentrations in the sulfuric acid solution, and preferably each concentration of $Cu^{2+}$ and $As^{5+}$ is equal to or less than each solubility of $Cu^{2+}$ and $As^{5+}$. Otherwise the leaching rates of Cu and As may decrease.

While the pH suitable for the production of crystalline scorodite which is subsequently synthesized is 0.3-1.5, the concentration of sulfuric acid used for sulfuric acid-leaching is such that pH may be less than 1, because the efficiency of the sulfuric acid-leaching, i.e., recovery of copper and arsenic tends to decrease when the concentration of sulfuric acid is low.

In leaching with sulfuric acid, for oxidizing As to pentavalent, it is sufficient to stir, for example, at 70 to 95° C. for 4.5 to 11 hours, and preferably at 80 to 95° C. for 7 to 11 hours. The leaching with sulfuric acid, which is an exothermic reaction, can be conducted without external heating. Stirring may be performed for a longer period, and the period should be suitably determined in view of a balance between economy and efficiency.

To enhance the oxidation efficiency of As, an oxygen-containing gas should be provided in a fine bubble form, and in a sufficient amount (for example, 10 equivalents of oxygen to copper and arsenic/7 hours). Thus, vigorous stirring is preferred. For example, feeding of the oxygen-containing gas and/or stirring are conveniently performed through jetting. The example value is in case of jetting (trade name: JET AJITER). With a stirrer equipped with conventional turbine blades, reaction efficiency will decrease. For example, even when the amount of the oxygen-containing gas fed is 3.5 times or more the above value, this reaction will take twice or more the above reaction time. Valency control of As at this stage facilitates production of scorodite in the subsequent step. $Cu^{2+}$ is also effective for promoting oxidation of As.

Any oxygen-containing gas that does not significantly have adverse effects on the reaction can be used. For example, pure oxygen, and mixtures of oxygen and inert gases can be used. From the viewpoint of handling and cost, air is preferred.

An acidic aqueous solution containing pentavalent As and trivalent Fe is obtained by adding the trivalent iron into a sulfuric acid-leached solution of an electrolytically precipitated copper. In this case, the trivalent iron includes iron oxide, iron sulfate, iron chloride and iron hydroxide. Preferably, the trivalent iron is provided in the form of acidic aqueous solution since the reaction is conducted in an aqueous solution; and preferably in the form of aqueous ferric sulfate ($Fe_2(SO_4)_3$) solution from the viewpoint of returning and recycling the post-scorodite-synthesis solution to the electrolyte for electrolytic smelting. As for an aqueous solution of ferric sulfate, aqueous polyferric sulfate solutions for use in drainage treatment, etc. can also be used.

The trivalent iron needs to be used in such an amount that Fe/As ratio in the reaction solution may be equal to or more than 0.9 and equal to or less than 1.1.

The acidic aqueous solution is preferably maintained at a pH of 0.3 to 2.2. When the solution has a pH of 0.3 or less, solubility of crystalline scorodite will rapidly increase so that production of the crystalline scorodite may be inhibited. When a pH being 2.2 or more, the iron added is precipitated as iron hydroxide so that iron cannot be effectively used for production of scorodite. The efficiency of production of crystalline scorodite is high when said acidic aqueous solution has a pH 0.3-1.0.

The crystalline scorodite can be produced, for example, by heating said acidic solution to 60 to 95° C. under atmospheric pressure. For example, a reaction for 8 to 72 hours yields a sufficient amount of the crystalline scorodite. However, Fe/As is defined around 1 in the present invention, and therefore, the time required for the synthesis is shorten, and for example, about 1 hour after, preferably about 30 minutes after, and more preferably immediately after the temperature of the reaction mixture reached to 95° C., the onset of synthesis of scorodite can be observed. Since As has been oxidized to pentavalent, the crystalline scorodite is produced by reacting with trivalent iron at high reaction efficiency. The crystalline scorodite is chemically stable, and suitable for long-term storage. When a solid-liquid separation into a residue containing said crystalline scorodite and post-dearsenic solution is performed, arsenic can be recovered as scorodite.

WORKING EXAMPLE

Example 1

To 5 L of sulfuric acid-leached solution of an electrolytically precipitated copper (pH 0.98, the preparation method thereof being described elsewhere), 3.3 L of water and 1.5 L of polyferric sulfate sold by Nittetsu Kogyo Corp. (also referred to as "poly-iron", hereafter) were added, and then pH thereof was adjusted to 0.5 with 0.3 L of 400 g/L sulfuric acid (1.1 equivalent of ferric iron based on arsenic). Finally, as a seed crystal, 500 g of crystalline scorodite was added. Subsequently, the solution was heated to 95° C. while it was concentrated again to 10 L, and synthesis of scorodite was performed for 24 hours. During the heating, in order to avoid the situation where the amount of the solution decreases too much by evaporation, water was appropriately added so that the amount of the solution may be kept at 10 L. The reaction did not progress immediately after the sulfuric acid-leached solution and ferric sulfate solution were mixed at room temperature. With heating, production of scorodite was observed about 1 hour after the temperature reached 95° C. After the synthesis of scorodite was completed, the crystal of scorodite was subjected to solid-liquid separation by filtration. The crystal of scorodite was washed with water. Table 1 shows the amounts in the resulting scorodite crystal and the post-scorodite-synthesis solution. Fe concentration in the post-scorodite-synthesis solution was 2.8 g/L which is equal to or less than ½ of that shown in Comparative example. This solution may be diluted with a copper sulfate solution, and then returned to the electrolysis tank used in an electrolytic refining step. As the copper sulfate solution, below-described blue vitriol solution may be used. Concentration of residual arsenic is 1.4 g/L which is also lower than that shown in Comparative example. It is revealed that reducing Fe/As improves the reaction efficiency. Arsenic content in the scorodite is 31%, and therefore, the rate of concentration of arsenic is high. A stable crystalline scorodite having little eluation of arsenic was obtained.

Eluation of arsenic from the scorodite obtained in this synthesis was 0.12 mg/L (with No. 13 test notified by Environment Ministry), and therefore, it was confirmed that arsenic is stable. Accordingly, it is deemed that the scorodite obtained is crystalline.

TABLE 1

| Post-sulfuric acid-leached solution, pH 0.98 | | | | Poly iron Fe/As = 1.1 | | | |
|---|---|---|---|---|---|---|---|
| amount (ml) | 5000 Quality (g/l) | number of moles (mol) | molecular weight | amount (ml) | 1500 Quality (g/l) | number of moles (mol) | molecular weight |
| As | 60.05 | 4.01 | 74.92 | T-As | | | |
| Fe | 0.00 | 0.00 | 55.85 | T-Fe | 164.0 | 4.41 | 55.850 |
| Cu | 65.79 | 5.18 | 63.55 | T-Cu | | | |
| Sb | 1.20 | 0.05 | 121.76 | Sb | | | |
| Bi | 0.00 | 0.00 | 208.98 | Bi | | | |
| Ni | 8.64 | 0.74 | 58.69 | Ni | | | |

Scorodite synthesis pH 0.50 (seed crystal 50 g/L, pH 0.5 adjusted with sulfuric acid 120 g), 95° C., 24 hr

| amount (ml) | 10000 Quality (g/l) | number of moles (mol) | molecular weight |
|---|---|---|---|
| As | 30.02 | 4.01 | 74.92 |
| Fe | 24.62 | 4.41 | 55.85 |
| Cu | 32.89 | 5.18 | 63.55 |
| Sb | 0.60 | 0.05 | 121.76 |
| Bi | 0.00 | 0.00 | 208.98 |
| Ni | 4.32 | 0.74 | 58.69 | pH 0.26 ORP563 mV

| Scorodite crystal (As eluation: No. 13, 0.12 g/L) | | | | Post-scorodite-synthesis solution | | | |
|---|---|---|---|---|---|---|---|
| amount (Dg) | 896 Quality (g/l) | number of moles (mol) | molecular weight | amount (ml) | 9990 Quality (g/l) | number of moles (mol) | molecular weight |
| As | 31.00 | 3.71 | 74.92 | As | 1.43 | 0.19 | 74.92 |
| Fe | 24.00 | 3.85 | 55.85 | Fe | 2.82 | 0.50 | 55.85 |
| Cu | 1.10 | 0.16 | 63.55 | Cu | 33.09 | 5.20 | 63.55 |
| Sb | 0.46 | 0.03 | 121.76 | Sb | 0.03 | 0.00 | 121.76 |
| Bi | 0.01 | 0.00 | 208.98 | Bi | | 0.00 | 208.98 |
| Ni | 0.00 | 0.00 | 58.69 | Ni | 3.90 | 0.66 | 58.69 |

<Process for Producing the Sulfuric Acid-Leached Solution of Electrolytically Precipitated Copper>

Process for producing the sulfuric acid-leached solution of electrolytically precipitated copper used in Example 1 is shown as follows.

(1) Electrolytically Precipitated Copper

To 726 g (dry weight) of electrolytically precipitated copper yielded in the copper smelting process, 574 g of 98% conc. sulfuric acid (0.9 equivalents based on the amount of copper included in the electrolytically precipitated copper. 0.1 equivalents are subtracted because it was already water-soluble copper) was added, and then water was added to adjust the amount of the slurry to 2.5 L (slurry concentration is 290 g/L).

Leaching was performed while feeding air at a rate of 7.6 L/minute for 6.5 hours with stirring. Since fine air bubbles were effective for high reaction efficiency, a JET AJITER (made by SHIMAZAKI) was used for feeding and agitation of air. The solution temperature was controlled with a water bath to 80° C. ORP gradually increased with leaching, which was 176 mV at the beginning of leaching, and 253 mV at the end of leaching. The behavior of ORP is characterized in that it is rapidly increased near the end of leaching, and therefore, the end point can be easily discerned. The concentration of copper at the end of the leaching was about 160 g/L which largely exceeded 50 g/L, the solubility at room temperature. The leached solution was left overnight without dilution at room temperature, and then copper sulfate 5 hydrate salt (blue vitriol) was deposited. Subsequently, the leached solution was separated into the sulfuric acid-leached filtrate, sulfuric acid-leached residue and blue vitriol as follows. Firstly, by filtration, the leached solution was separated into the sulfuric acid-leached filtrate and mixture of sulfuric acid-leached residue and blue vitriol. The mixture of sulfuric acid-leached residue and blue vitriol was washed with small amount of water to remove the sulfuric acid-leached solution. The washing water was subjected to a filtration step, the filtrate of which was referred to as blue vitriol washing liquid. The filtration residue was added to the sulfuric acid-leached residue. The blue vitriol washing liquid was added to the sulfuric acid-leached filtrate due to high concentration of arsenic. After the water washing, the mixture of sulfuric acid-leached residue and blue vitriol was dissolved in 2.5 L of water, and then separated by filtration into the sulfuric acid-leached residue and blue vitriol dissolved solution. Table 2 shows the amounts in the resulting sulfuric acid-leached filtrate, sulfuric acid-leached residue, blue vitriol dissolved solution and the blue vitriol washing solution. In Examples 1, 2 and 3, and Comparative example 1, said operation was performed for 7 batches, and the sulfuric acid-leached filtrate, blue vitriol washing solution and water were mixed so that the volume of the mixture may be adjusted to 20 L. The arsenic concentration was adjusted to about 60 g/L with the blue vitriol washing solution. For each test, this solution was divided into 5 L portions and then used.

TABLE 2

Sulfuric acid-leaching: pulp conc. 290 g/L, 80° C., 6.5 hrs, air 7.61/min (JETAJITER), ended at ORP 253 Mv

| amount (ml) | 2500 Quality (g/l) | number of moles (mol) | molecular weight |
|---|---|---|---|
| As | 81.9 | 2.73 | 74.92 |
| Fe | 0.0 | — | 55.85 |
| Cu | 162.0 | 6.37 | 63.55 |
| Sb | 2.0 | 0.04 | 121.76 |
| Bi | 1.5 | 0.02 | 208.98 |
| Ni | 2.8 | 0.12 | 58.69 |
| Pb | 3.4 | 0.04 | 207.21 |
| H2SO4 | 224.9 | 5.73 | 98.07 | kept at room temp. and blue vitriol deposited    pH 0.98    ORP 212 mV

Sulfuric acid-leached residue (Dry)

| amount (Dg) | 56.0 Quality (%) | number of moles (mol) | molecular weight |
|---|---|---|---|
| As | 14.0 | 0.10 | 74.92 |
| Fe | 0.02 | — | 55.85 |
| Cu | 23.0 | 0.20 | 63.55 |
| Sb | 1.5 | 0.01 | 121.76 |
| Bi | 5.3 | 0.01 | 208.98 |
| Ni |  | 0.00 | 58.69 |
| Pb | 19.0 | 0.05 | 207.21 | pH 1.54    ORP233 mV

Sulfuric acid-leached filtrate

| amount (ml) | 2102 Quality (g/l) | number of moles (mol) | molecular weight |
|---|---|---|---|
| As | 76.00 | 2.13 | 74.92 |
| Fe |  | 0.00 | 55.85 |
| Cu | 96.61 | 3.20 | 63.55 |
| Sb | 1.71 | 0.03 | 121.76 |
| Bi |  | 0.00 | 208.98 |
| Ni | 2.37 | 0.08 | 58.69 |
| Pb |  | 0.00 | 207.21 |

Blue vitriol washing solution

| amount (ml) | 910 Quality (g/l) | number of moles (mol) | molecular weight |
|---|---|---|---|
| As | 21.21 | 0.26 | 74.92 |
| Fe |  | 0.00 | 55.85 |
| Cu | 59.28 | 0.85 | 63.55 |
| Sb |  | 0.00 | 121.76 |
| Bi |  | 0.00 | 208.98 |
| Ni |  | 0.00 | 58.69 |
| Pb |  | 0.00 | 207.21 |

Blue vitriol dissolved solution

| amount (ml) | 2500 Quality (g/l) | number of moles (mol) | molecular weight |
|---|---|---|---|
| As | 0.77 | 0.03 | 74.92 |
| Fe |  | 0.00 | 55.85 |
| Cu | 63.83 | 2.51 | 63.55 |
| Sb |  | 0.00 | 121.76 |
| Bi |  | 0.00 | 208.98 |
| Ni |  | 0.00 | 58.69 |
| Pb |  | 0.00 | 207.21 |

Example 2

To 5 L of sulfuric acid-leached solution of electrolytically precipitated copper (pH 1.04, process for producing it being described in Example 1), 3.2 L of water and 1.37 L of poly-ferric sulfate (also referred to as "poly-iron", hereafter) available from Nittetsu Kogyo Corp. were added, and then pH was adjusted to 0.5 with 0.390 L of 400 g/L sulfuric acid (1 equivalent of the ferric based on the arsenic). Finally, as a seed crystal, 500 g (dry weight) of crystalline scorodite was added. Subsequently, the solution was heated to 95° C. while it was adjusted again to 10 L, and synthesis of scorodite was performed for 24 hours. During the heating, in order to avoid the situation where the amount of the solution decreases too much by evaporation, water was appropriately added so that the amount of the solution may be kept at 10 L. Just after mixing the sulfuric acid-leached solution with the ferric sulfate solution at a room temperature, the reaction did not take place. With heating, precipitation of scorodite was observed just after the temperature reached 95° C. After the completion of the reaction, the scorodite crystal was subjected to solid-liquid separation by filtration. The scorodite crystal was washed with water. Table 3 shows the amounts in the resulting scorodite crystal and the post-scorodite-synthesis solution. Fe concentration in the post-scorodite-synthesis solution was 0.92 g/L which is less than that shown in Comparative example 1 by one digit, and less than 1 g/L. This solution may be returned, without dilution, to the electrolysis tank used in an electrolytic refining step. Concentration of the remaining arsenic is 0.78 g/L which is less than that shown in Comparative example 1. It is also revealed that reducing Fe/As improved the reaction efficiency. Arsenic content in the scorodite is 31%, and therefore, the degree of concentration of arsenic is high. A stable crystalline scorodite having little eluation of arsenic was obtained.

Eluation of arsenic from the scorodite obtained in this synthesis was 0.20 mg/L (with No. 13 test notified by Environment Ministry), and therefore, it was confirmed that arsenic is stable. Accordingly, it is deemed that the scorodite obtained is crystalline.

formed for 24 hours. During the heating, in order to avoid the situation where the amount of the solution decreases too much by evaporation, water was appropriately added so that the amount of the solution may be kept to 9.6 L. Just after mixing the sulfuric acid-leached solution with the ferric sulfate solution at a room temperature, the reaction did not take place. With heating, precipitation of scorodite was observed about 0.5 hour after the temperature reached 95° C. After the completion of the synthesis of scorodite, the scorodite crystal was subjected to solid-liquid separation by filtration. The scorodite crystal was washed with water. Table 4 shows the amounts in the resulting scorodite crystal and the post-scorodite-synthesis solution. Fe concentration in the post-scorodite-synthesis solution was 0.87 g/L which is less than that shown in Comparative example by one digit, and less than 1 g/L. This solution may be returned, without dilution, to

TABLE 3

| | Sulfuric acid-leached filtrate, pH 1.04 | | | | Poly iron Fe/As = 1.0 | | |
|---|---|---|---|---|---|---|---|
| amount (ml) | 5000 Quality (g/l) | number of moles (mol) | molecular weight | amount (ml) | 1368 Quality (g/l) | number of moles (mol) | molecular weight |
| As | 60.19 | 4.02 | 74.92 | T-As | | | |
| Fe | 0.00 | 0.00 | 55.85 | T-Fe | 164.0 | 4.02 | 55.85 |
| Cu | 65.17 | 5.13 | 63.55 | T-Cu | | | |
| Sb | 1.25 | 0.05 | 121.76 | Sb | | | |
| Bi | 0.00 | 0.00 | 208.98 | Bi | | | |
| Ni | 10.21 | 0.87 | 58.69 | Ni | | | |

Scorodite synthesis pH 0.50 (seed crystal 50 g/L, pH 0.5 adjusted with sulfuric acid 156 g), 95° C., 24 hr

| amount (ml) | 10000 Quality (g/l) | number of moles (mol) | molar weight |
|---|---|---|---|
| As | 31.00 | 4.14 | 74.92 |
| Fe | 23.22 | 4.16 | 55.85 |
| Cu | 32.59 | 5.13 | 63.55 |
| Sb | 0.62 | 0.05 | 121.76 |
| Bi | 0.00 | 0.00 | 208.98 |
| Ni | 5.10 | 0.87 | 58.69 | pH 0.46 ORP566 mV

| | Scorodite crystal (As eluation: No. 13, 0.20 g/L: | | | Post-scorodite-synthesis solution | | | |
|---|---|---|---|---|---|---|---|
| amount (Dg) | 931 Quality (%) | number of moles (mol) | molecular weight | amount (ml) | 9570 grade (g/l) | number of moles (mol) | molecular weight |
| As | 31.00 | 3.85 | 74.92 | As | 0.78 | 0.10 | 74.92 |
| Fe | 24.00 | 0.00 | 55.85 | Fe | 0.92 | 0.16 | 55.85 |
| Cu | 1.10 | 0.16 | 63.55 | Cu | 36.00 | 5.42 | 63.55 |
| Sb | 0.46 | 0.04 | 121.76 | Sb | 0.02 | 0.00 | 121.76 |
| Bi | 0.01 | 0.00 | 208.98 | Bi | | 0.00 | 208.98 |
| Ni | 0.00 | 0.00 | 58.69 | Ni | 5.42 | 0.88 | 58.69 |

Example 3

To 4.77 L of sulfuric acid-leached solution of electrolytically precipitated copper (pH 1.07, process for producing it being described in Example 1), 3 L of water and 1.26 L of polyferric sulfate (also referred to as "poly-iron", hereafter) available from Nittetsu Kogyo Corp. were added, and then pH was adjusted to 0.5 with 0.345 L of 400 g/L sulfuric acid (0.97 equivalent of the ferric based on the arsenic). Finally, as a seed crystal, 480 g (dry weight) of crystalline scorodite was added. Subsequently, the solution was heated to 95° C. while it was adjusted again to 9.6 L, and synthesis of scorodite was perthe electrolysis tank used in an electrolytic refining step. Concentration of the remaining arsenic is 1.4 g/L which is less than that shown in Comparative example 1. It is revealed that reducing Fe/As improved the reaction efficiency. Arsenic content in the scorodite is 31%, and therefore, the degree of concentration of arsenic is high. A stable crystalline scorodite having little eluation of arsenic was obtained.

Eluation of arsenic from the scorodite obtained in this synthesis was 0.33 mg/L (with No. 13 test notified by Environment Ministry), and therefore, it was confirmed that arsenic is stable. Accordingly, it is deemed that the scorodite obtained is crystalline.

TABLE 4

Sulfuric acid-leached filtrate, pH 1.07

| amount (ml) | 4770 Quality (g/l) | number of moles (mol) | molecular weight |
|---|---|---|---|
| As | 60.05 | 3.823 | 74.92 |
| Fe | 0.00 | 0.000 | 55.85 |
| Cu | 65.79 | 4.938 | 63.55 |
| Sb | 1.25 | 0.049 | 121.76 |
| Bi | 0.00 | 0.000 | 208.98 |
| Ni | 9.05 | 0.736 | 58.59 |

Poly iron Fe/As = 1.0 (actually 0.97)

| amount (ml) | 1263 Quality (g/l) | number of moles (mol) | molecular weight |
|---|---|---|---|
| T-As | | | |
| T-Fe | 164.0 | 3.708 | 55.850 |
| T-Cu | | | |
| Sb | | | |
| Bi | | | |
| Ni | | | |

Scorodite synthesis pH 0.50 (seed crystal 50 g/L, pH 0.5 adjusted with sulfuric acid 136 g), 95° C., 24 hr

| amount (ml) | 9600 Quality (g/l) | number of moles (mol) | molar weight |
|---|---|---|---|
| As | 30.09 | 3.856 | 74.92 |
| Fe | 21.79 | 3.745 | 55.85 |
| Cu | 32.92 | 4.973 | 63.55 |
| Sb | 0.62 | 0.049 | 121.76 |
| Bi | 0.00 | 0.000 | 208.98 |
| Ni | 4.50 | 0.736 | 58.69 | pH 0.36 ORP563 mV

Scorodite crystal (As eluation: No. 13, 0.33 g/L)

| amount (Dg) | 877 Quality (%) | number of moles (mol) | molecular weight |
|---|---|---|---|
| As | 31.00 | 3.63 | 74.92 |
| Fe | 24.00 | 0.00 | 55.85 |
| Cu | 1.10 | 0.15 | 63.55 |
| Sb | 0.46 | 0.03 | 121.76 |
| Bi | 0.01 | 0.00 | 208.98 |
| Ni | 0.00 | 0.00 | 58.69 |

Post-scorodite-synthesis solution

| amount (ml) | 9410 Quality (g/l) | number of moles (mol) | molecular weight |
|---|---|---|---|
| As | 1.43 | 0.18 | 74.92 |
| Fe | 0.87 | 0.15 | 55.85 |
| Cu | 32.91 | 4.87 | 63.55 |
| Sb | 0.01 | 0.00 | 121.76 |
| Bi | | 0.00 | 208.98 |
| Ni | 4.21 | 0.68 | 58.69 |

Comparative Example 1

To 5 L of sulfuric acid-leached solution of electrolytically precipitated copper (pH 1.07, process for producing it being described in Example 1), 3.3 L of water and 1.64 L of polyferric sulfate (referred to as "poly-iron", hereafter) available from Nittetsu Kogyo Corp. were added, and then pH was adjusted to 0.5 with 0.538 L of 400 g/L sulfuric acid (1.2 equivalent of the ferric based on the arsenic). Finally, as a seed crystal, 500 g (dry weight) of crystalline scorodite was added. Subsequently, the solution was heated to 95° C. while it was concentrated again to 10 L, and synthesis of scorodite was performed for 24 hours. During the heating, in order to avoid the situation where the amount of the solution decreases too much by evaporation, water was appropriately added so that the amount of the solution may be kept to 10 L. Just after mixing the sulfuric acid-leached solution with the ferric sulfate solution at a room temperature, the reaction did not take place. With heating, precipitation of scorodite was observed about 3.5 hours after the temperature reached to 95° C. After the completion of the synthesis of scorodite, the scorodite crystal was subjected to solid-liquid separation by filtration. The scorodite crystal was washed with water. Table 5 shows the amounts in the resulting scorodite crystal and the post-scorodite-synthesis solution. Fe concentration in the post-scorodite-synthesis solution was 6.5 g/L which is more than those shown in Examples, and more than 5 g/L. The Fe concentration of this solution is too high, and therefore, it was difficult to return this solution to the electrolysis tank used in an electrolytic refining step. Diluting this solution is not practical because the amount of diluent is large compared to ones shown in Examples. Concentration of the remaining arsenic is 2.5 g/L which is more than that shown in Examples. It was revealed that increasing Fe/As decreased the reaction efficiency. Arsenic content in the scorodite is 31%, and therefore, the degree of concentration of arsenic is high. A stable crystalline scorodite having little eluation of arsenic was obtained.

Eluation of arsenic from the scorodite obtained in this synthesis was 0.13 mg/L (with No. 13 test notified by Environment Ministry), and therefore, it was confirmed that arsenic is stable. Accordingly, it is deemed that the scorodite obtained is crystalline.

TABLE 5

Sulfuric acid-leached filtrate, pH 1.07

| amount (ml) | 5000 Quality (g/l) | number of moles (mol) | molecular weight |
|---|---|---|---|
| As | 60.05 | 4.007 | 74.92 |
| Fe | 0.00 | 0.000 | 55.85 |
| Cu | 65.79 | 5.176 | 63.55 |
| Sb | 1.20 | 0.049 | 121.76 |
| Bi | 0.00 | 0.000 | 208.98 |
| Ni | 8.64 | 0.736 | 58.69 |

Poly iron Fe/As = 1.2

| amount (ml) | 1638 Quality (g/l) | number of moles (mol) | molecular weight |
|---|---|---|---|
| T-As | | | |
| T-Fe | 164.0 | 4.809 | 55.850 |
| T-Cu | | | |
| Sb | | | |
| Bi | | | |
| Ni | | | |

TABLE 5-continued

Scorodite synthesis pH 0.50 (seed crystal 50 g/L, pH 0.5 adjusted with sulfuric acid 215 g), 95° C., 24 hr

| amount (ml) | 10000 Quality (g/l) | number of moles (mol) | molar weight |
|---|---|---|---|
| As | 30.02 | 4.007 | 74.92 |
| Fe | 26.86 | 4.809 | 55.85 |
| Cu | 32.89 | 5.176 | 63.55 |
| Sb | 0.60 | 0.049 | 121.76 |
| Bi | 0.00 | 0.000 | 208.98 |
| Ni | 4.32 | 0.736 | 58.69 | pH 0.25 ORP615 mV

Scorodite crystal (As eluation: No. 13, 0.13 g/L)

| amount (Dg) | 846.6 Quality (%) | number of moles (mol) | molecular weight |
|---|---|---|---|
| As | 31.00 | 3.50 | 74.92 |
| Fe | 24.00 | 3.64 | 55.85 |
| Cu | 1.10 | 0.15 | 63.55 |
| Sb | 0.46 | 0.03 | 121.76 |
| Bi | 0.01 | 0.00 | 208.98 |
| Ni | 0.00 | 0.00 | 58.69 |

Crystal filtrate

| amount (ml) | 10720 Quality (g/l) | number of moles (mol) | molecular weight |
|---|---|---|---|
| As | 2.50 | 0.36 | 74.92 |
| Fe | 6.48 | 1.24 | 55.85 |
| Cu | 29.00 | 4.89 | 63.55 |
| Sb | 0.02 | 0.00 | 121.76 |
| Bi |  | 0.00 | 208.98 |
| Ni | 4.12 | 0.75 | 58.69 |

With regard to Examples 1, 2 and Comparative example 1, relationship between the reaction time and the concentration of the remaining arsenic is shown in FIG. 1. From FIG. 1, it is revealed that the smaller Fe/As is, the faster the reaction rate is.

The invention claimed is:

1. A process for recycling a post-scorodite-synthesis solution, comprising the steps of:
   (1) conducting a sulfuric acid leaching by feeding an oxygen-containing gas into an electrolytically precipitated copper in an acidic aqueous solution of sulfuric acid, while stirring the solution at a temperature and for a time sufficient for oxidizing As component contained in the electrolytically precipitated copper to pentavalent, followed by solid-liquid-separation of the solution into a post-leaching residue and a sulfuric acid-leached solution containing the pentavalent As component,
   (2) adding ferric sulfate into said sulfuric acid-leached solution so that the molar ratio of trivalent Fe to pentavalent As may be equal to or more than 0.9 and equal to or less than 1.1 to prepare a reaction solution, followed by synthesis of a crystalline scorodite,
   (3) after the synthesis of the scorodite, conducting solid-liquid-separation of the reaction solution into a post-scorodite-synthesis solution and a scorodite crystal, and
   (4) using the post-scorodite-synthesis solution directly as an electrolyte solution used in electrolytic refining of copper.

2. The process according to claim 1, further comprising the steps of:
   (1)' adding water to the post-leaching residue in step (1) for dissolving copper sulfate, followed by solid-liquid separation of a copper sulfate solution from the post-leaching residue, and
   (3) adding said copper sulfate solution to the post-scorodite-synthesis solution obtained in Step (3) between Step (3) and Step (4).

* * * * *